3,418,381
PROCESS FOR THE PRODUCTION OF
VINYLPHENOLS
Thomas J. Jennings, Lafayette, and Paul H. Williams, Orinda, Calif., assignors to Shell Oil Company, New York, N.Y., a corporation of Delaware
No Drawing. Filed June 17, 1966, Ser. No. 558,241
8 Claims. (Cl. 260—624)

This invention relates to an improved process for the production of vinyl- and isopropenylphenols from the corresponding ethyl and isopropyl phenols. More particularly, the invention relates to an improved process for the production of m-vinylphenol and m-isopropenylphenol from m-ethylphenol and m-isopropylphenol, respectively.

Vinyl- and isopropenylphenols have become of increasing importance in a wire field of practical application including, for example, the production of resins, plastics, synthetic rubber, solvents, and agricultural chemical derivatives. Their availability in quantity at relatively low cost is therefore highly desirable. Methods for their production disclosed heretofore comprise, for example, the partial dehydrogenation of corresponding alkylphenols; the cracking of several m-alkylphenols; and the reaction of m-hydroxybenzaldehyde with the Grignard reagent with subsequent formation of m-ethylphenol. However, these methods are often handicapped by disadvantages which materially militate against their application on a commercial scale. The desired compounds are often obtained in relatively low yields, thereby necessitating the recycling of unusually large quantities of unconverted feed. In addition, many of the processes rely upon the use of molecular oxygen, or compounds yielding oxygen in situ, as an essential component of the charge; this generally produces a relatively large proportion of by-products including oxides of carbon, which reduce still further the yield of desired substituted phenols and materially increase the cost of the process.

It is therefore an object of the present invention to provide an improved process for the production of vinyl- and isopropenylphenols wherein the above difficulties are obviated to at least a substantial degree.

A particular object of the invention is to provide an improved process for the more efficient production of m-vinylphenol and m-isopropenylphenol.

In accordance with the present invention, vinylphenols, particularly phenols or methyl-substituted phenols having at least one vinyl group attached directly to the aromatic nucleus, are produced by reacting a suitable alkylphenol, particularly phenols or methyl-substituted phenols having at least one alkyl radical, i.e., ethyl or isopropyl, attached directly to the aromatic nucleus, with sulfur dioxide, in vapor phase at a temperature of from about 300° to about 700° C. in the presence of a metal phosphate catalyst, preferably niobium phosphate or a mixed phosphate of an alkaline earth metal or aluminum and of cobalt or nickel.

By "vinyl" in "vinylphenol" is meant the

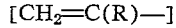

group. Thus, vinyls of 2 to 3 carbons comprise the vinyl [CH$_2$=CH—] and α-methylvinyl [CH$_2$=C(CH$_3$)—] groups. Thus, the vinylphenols can be represented by the formula

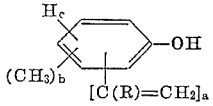

where $a+b+c=5$, and R is hydrogen or CH$_3$; $a$ is preferably 1, but may be 1 to 2, and $b$ is zero to 3, preferably no more than 2. The vinyl groups are preferably meta or para to the hydroxyl on the aromatic nucleus.

Therefore, suitable alkyl-substituted phenols used as a charge for the present invention comprise those consisting essentially of a hydroxy-substituted benzene ring having at least one ethyl and/or isopropyl group directly attached to the benzene nucleus. In addition to the ethyl and/or isopropyl substituents, the suitable alkylphenols may have one or more methyl groups directly attached to a carbon in the benzene nucleus. To avoid dehydrocyclization, however, it is preferred that the alkyl group which is to undergo dehydrogenation be meta or para with respect to the hydroxyl group on the benzene ring. Examples of suitable alkylphenols which may be employed as charge to the process of the invention are, for example, m-ethylphenol, m-isopropylphenol, ethylcresols, isopropylcresols and ethyl- and isopropylxylenols. Mixtures of one or more of the alkylphenols mentioned above may be employed.

The alkylphenols may be obtained from any suitable source. They need not necessarily be pure and may contain minor amounts of substances which are inert or do not adversely affect the reaction, such as are generally found in commercially available alkylphenols. Suitable alkylphenols comprise the ethyl- and isopropyl-substituted phenols obtained by conventional alkylation of phenol, the cresols or the xylenols.

The alkylphenol feed may be subjected to suitable conventional pretreatment to effect the removal of undesired components or impurities. This pretreatment may comprise, for example, clay treatment, acid treatment, or contact with suitable ion exchange resins.

In accordance with the process of the invention, reaction of the alkyl-substituted phenol with sulfur dioxide is carried out in the presence of a catalyst consisting essentially of a metal phosphate. Although metal phosphates broadly constitute a suitable class of catalysts, the members of this broad class are not necessarily equivalent with respect to their effectiveness. Preferred catalysts comprise phosphates of the alkaline earth metals, indium, iron, cobalt, nickel, aluminum and niobium; two or more of the metal phosphates in combination may be employed as catalyst. Catalysts comprising two or more of these metals may contain them as solid solutions of their phosphates, such as aluminum-cobalt phosphate, or they may comprise the metals in chemical combination with phosphrous and oxygen to form a chemical compound, complex or composition, such as niobium phosphate. Particularly preferred catalysts comprise those containing a phosphate of an alkaline earth metal, such as calcium phosphate, and those comprising an alkaline earth metal in chemical combination with a Group VIII metal, phosphorus and oxygen, as, for example, calcium-nickel phosphate.

While no specific atomic ratio of the Group VIII metal to the alkaline earth metal in this preferred catalyst system is required, in the preferred modification, the catalyst contains, on the average, an atom ratio of Group VIII metal to alkaline earth metal of from about 1:10 to 10:1. When a calcium-nickel phosphate is employed, best results are obtained through utilization of catalyst wherein the atom ratio of nickel to calcium is from about 1:0.5 to about 1:20, particularly from about 1:4 to about 1:10. When the catalyst system is, for example, a nickel-aluminum phosphate, atomic ratios comparatively high in aluminum are more satisfactory, such as nickel-aluminum phosphates wherein the atomic ratio of nickel to aluminum is from about 1:1 to about 1:9. Alternatively, when a cobalt aluminum phosphate is employed, atomic ratios of cobalt to aluminum of from about 1:3 to 9:1 are suitable. With catalysts such as niobium phosphate, the atomic ratio of niobium to phosphorus is preferably from about 1:0.2 to 1:2.

The metal phosphates above-defined may be used as such, or in combination with a suitable solid support or diluent material, for example, the aluminous and/or silicious catalyst support materials, such as the aluminas, silica-aluminas, or silica gel. Other suitable support materials comprise, for example, silicon carbide, corundum, and clays.

The catalyst may be employed in the form of a stationary bed positioned in a suitable reaction zone providing for intimate contact between reactants and catalyst. Suitable reaction zones may comprise one or more chambers of enlarged cross-sectional area, reaction zones of restricted cross-sectional areas, such as tubular reactors, or combinations thereof. The process further lends itself to execution with the catalyst in the form of a fluidized bed or in a suspended state.

The reaction is preferably carried out in the presence of an amount of sulfur dioxide at least equal to, and preferably exceeding, the molar amount of alkyl-substituted phenol reactant. In a preferred method of carrying out the invention, the molar ratio of sulfur dioxide to alkylphenol charged to the reactor is maintained in the range of from about 3:1 to 5:1; however, although advantage resides in effecting the reaction within this defined preferred range of sulfur dioxide to alkylphenol, higher or lower ratios of the reactants may be used within the scope of the invention. Thus, molar ratios of $SO_2$ to alkylphenol in the range of from about 0.5:1 to about 10:1 and higher may be employed. The sulfur dioxide component may at times be employed in a manner functioning additionally as an entraining agent. When used as such, the higher ratios of sulfur dioxide to the alkylphenol component are preferably employed. When using the catalyst in the form of fluidized bed or in the suspended form, the sulfur dioxide may be employed as the fluidizing, suspending, or entraining medium. It is to be stressed, however, that essential to the obtainment of the objects of the invention is the presence of sulfur dioxide, other oxides of sulfur, such as sulfur trioxide, or oxygen-containing gases, being unsuited.

Reaction of the sulfur dioxide with the alkylphenol is effected in the vapor state at a temperature in the range of from about 300° to about 700° C., preferably in the range of from about 400° to about 650° C. The temperature range of from about 450° to about 600° C. is particularly preferred. The reactants fed into the reactor in accordance with the invention may be preheated prior to introduction into the reaction zone. The alkylphenol and the sulfur dioxide components of the charge may be preheated separately and introduced into the reaction zone as a single combined stream or as separate streams. A part of the reactants may be injected into the reaction zone at one or more points along the length thereof.

The pressure employed is generally not critical. Thus, the invention may be executed at subatmospheric, atmospheric, or superatmospheric pressure. In general, however, it is preferred to maintain a pressure sufficiently high to facilitate circulation of materials through the system. A particularly desirable pressure range is from about atmospheric pressure to 350 p.s.i.g.

The space velocity employed may vary considerably in accordance with the type of catalyst bed employed and other operating conditions used, as well as the specific alkyl-substituted phenol being converted. The process of the invention generally enables the use of relatively high space velocities. The gaseous hourly space velocity, GHSV, as used herein is defined as the total volume of gaseous charge to the reaction zone of the process, calculated under standard conditions, passed per hour, per unit volume of catalyst bed. A gas hourly space velocity in excess of 200, and generally up to 5000 is generally satisfactory, with a GHSV of between about 400 and 2000 being preferred. Higher or lower space velocities may be used. The space velocity may be varied to control the severity of reaction conditions and consequent extent to which the alkylphenols are converted.

Under the above-defined conditions, the alkylphenols fed into the reaction zone are converted to the corresponding alkylene-substituted phenols. For example, m-ethylphenol is converted to m-vinylphenol, m-isopropylphenol to m-α-methylvinylphenol (m - isopropenylphenol), m-ethyl-o-cresol to m-vinyl-o-cresol, and so forth.

As indicated above, conditions preferably employed within the broad range defined herein will vary to some extent with the specific alkylphenol charged. Thus, the isomeric forms of ethylphenol will not all undergo equivalent behavior under equal conditions. The meta isomer will react to produce a product consisting essentially of m-vinylphenol. However, the ortho isomer under similar reaction conditions will dehydrocyclize to benzofuran almost exclusively, with little or no o-vinylphenol; and the para isomer will be converted almost completely to polymeric materials, probably through the further reaction of p-vinylphenol, known to be extremely reactive. It should be noted, however, that this is the case only when the reaction conditions employed in the production of, for example, m-vinylphenol from m-ethylphenol are used in an attempt to convert, for example, p-ethylphenol to p-vinylphenol. Suitable steps may be taken in such a case to avoid the formation of polymeric material, such as rapid quenching of the product effluent, rapid removal of the sulfur dioxide, or the use of inhibitors known to stem the polymerization of vinyl-containing compounds, such as tertiary butyl catechol.

Reaction zone effluence is passed to suitable recovery means which may comprise one or more such steps as distillation, extractive distillation, absorption, and the like. Unconverted alkylphenols or incompletely converted alkylphenols as well as residual sulfur dioxide is recycled in part, or entirely, to the reaction zone. During the course of the process, gaseous reaction products formed will include substantial amounts of hydrogen sulfide. The hydrogen sulfide produced may be separated and eliminated from the system or may be converted by conventional means to products comprising sulfur dioxide suitable for reuse in the reaction. Selective oxidation of the hydrogen sulfide in the presence of materials normally recycled within the process may be used.

Normally gaseous products present in the reactor effluent emanating from such materials introduced into the reaction zone or produced during the course of reaction may be separated and subjected to oxidizing conditions in the presence of sulfur and/or hydrogen sulfide, emanating from an outside source or obtained from within the system, to produce sulfur dioxide-containing gases suitable for recycling to the reaction zone. It is to be noted that when resorting to such expedients, care is taken to avoid the passage of any substantial amounts of free oxygen and/or sulfur trioxide to the reaction zone.

During the course of the process, the activity of the catalyst will decline progressively as a consequence of deposition of carbonaceous material thereon. Such deposits may be removed from the catalyst by contacting with oxygen or an oxygen-containing gas at an elevated temperature, thereby burning off the carbonaceous deposits. Such reactivation of the catalyst may be effected at temperatures in the range of from about 400° to about 800° C. It is preferred to sweep the reactivated catalyst with sulfur dioxide or sulfur dioxide-containing gas before its reuse in the process.

The following examples are given for illustrative purposes only, and should not be considered as limiting the invention. Results indicated in the following examples are based upon analysis of the products by mass spectroscopy unless otherwise noted.

EXAMPLES I–III

In a plurality of separate operations (Runs 1–3), m-vinylphenol was produced by passing a gaseous mixture of m-ethylphenol, sulfur dioxide and helium through a bed of particulate calcium-nickel phosphate catalyst. The ratio of the calcium atoms to nickel atoms in the catalyst for these three runs was 7:1. The helium was present merely as inert diluent. The specific reaction conditions employed are set forth in Table I, as well as the results obtained for each of the separate operations in terms of conversion of ethylphenol charged and the selectivity to m-vinylphenol.

TABLE I

| Run No. | 1 | 2 | 3 |
|---|---|---|---|
| Feed composition, mole percent: | | | |
| m-Ethylphenol | 11 | 11 | 9 |
| $SO_2$ | 36 | 36 | 45 |
| Reactor temperature, °C | 499 | 544 | 559 |
| Total GHSV | 1,900 | 3,800 | 1,580 |
| Conversion, percent | 72 | 54 | 97 |
| Selectivity, mole percent | 79 | 97 | 96 |

EXAMPLE IV

In a modified reactor system, 9.06 ml. of liquid m-ethylphenol was passed over 5 ml. calcium-nickel phosphate catalyst (10–20 mesh granules) with 2.46 liters gaseous $SO_2$, and 3.7 liters helium during a 40-minute period. The reactor was operated at a temperature of 550° C. The ratio of atoms of calcium to atoms of nickel in the catalyst was about 7:1. The product was analyzed by gas-liquid chromatography. Of the m-ethylphenol fed into the reaction zone, 46% was converted with 63% wt. selectivity to m-vinylphenol, and about 7% wt. hydroxybenzothiophenes and benzothiophene. No special precautions were taken or inhibitors added to prevent polymerization of the products during the reaction or analyses.

EXAMPLE V

A niobium phosphate catalyst was prepared by stirring niobium oxide powder into sufficient 55% phosphoric acid to give an atomic ratio of Nb:P of 1:1.2. The resulting slip was allowed to stand overnight, then dried at 150° C. for two hours and calcined at 450° C.

A gaseous mixture containing 16% by volume m-ethylphenol and 84% by volume sulfur dioxide was passed over a granular bed of this niobium phosphate at a GHSV of 430 at 550° C. A 78% conversion of the m-ethylphenol was obtained, with molar selectivities of 96% to m-vinylphenol and about 1% to hydroxybenzothiophene and benzothiophene.

EXAMPLE VI

An aluminum-cobalt phosphate was prepared by mixing an acidic solution of aluminum and cobalt nitrates with an alkaline ammonium phosphate solution to give a resulting pH of about 8 and precipitate an aluminum-cobalt phosphate of approximate atomic ratio of Al:Co:P of 7:1:8. The precipitate was washed, dried and calcined at 450° C.

A gaseous mixture of m-ethylphenol and sulfur dioxide was passed over a granular bed of this catalyst under conditions similar to those described in Example V but with a GHSV of 860. Conversion of the m-ethylphenol was 86% with 97% molar selectivity to m-vinylphenol.

EXAMPLE VII

An aluminum-nickel phosphate was prepared from the interaction of aluminum and nickel nitrates with ammonium phosphate in a manner similar to that described in Example VI, to give a material of atomic ratio Al:Ni:P of 7:1:8.

On reacting m-ethylphenol with sulfur dioxide over a granular bed of this aluminum-nickel phosphate, under conditions similar to those described in Example VI, 71% conversion of the m-ethylphenol was obtained with 93% molar selectivity to m-vinylphenol.

We claim as our invention:

1. A process of producing vinylphenols containing, besides phenolic hydroxyl, only hydrogen atoms, methyl groups and vinyl groups of 2 to 3 carbon atoms on the nuclear carbons, by contacting a mixture of the corresponding alkylphenol and from about 0.5 to about 10 mole proportion of sulfur dioxide in vapor phase at a temperature of from about 300° C. to about 700° C. with a metal phosphate catalyst comprising (1) niobium phosphate or (2) a mixed phosphate of an alkaline earth metal or aluminum and of nickel or cobalt.

2. A process in accordance with claim 1 wherein said metal phosphate catalyst is calcium-nickel phosphate.

3. A process in accordance with claim 1 wherein said metal phosphate catalyst is niobium phosphate.

4. A process in accordance with claim 1 wherein said metal phosphate catalyst is aluminum-cobalt phosphate.

5. A process in accordance with claim 1 wherein said metal phosphate catalyst is aluminum-nickel phosphate.

6. A process in accordance with claim 1 wherein the alkylphenol is m-ethylphenol.

7. A process in accordance with claim 1 wherein the alkylphenol is m-isopropylphenol.

8. A process in accordance with claim 1 wherein a mixed phosphate catalyst is employed in the form of a stationary bed.

References Cited

UNITED STATES PATENTS

| 1,215,335 | 2/1917 | Bosch et al. | 252—437 |
| 1,986,241 | 1/1935 | Wulff et al. | 252—437 |
| 2,824,843 | 2/1958 | Dietzler et al. | 252—437 |
| 3,327,008 | 6/1967 | Noddings et al. | 252—437 |
| 3,327,009 | 6/1967 | Noddings et al. | 252—437 |

OTHER REFERENCES

Corson et al.: J. Organic Chem., vol. 23, pp. 544–549 (1958), QD 241.J6.

LEON ZITVER, *Primary Examiner.*

W. B. LONE, *Assistant Examiner.*

U.S. Cl. X.R.

260—329, 332.3, 626